US008613651B2

(12) United States Patent
Ghaly

(10) Patent No.: US 8,613,651 B2
(45) Date of Patent: Dec. 24, 2013

(54) GAMING DEVICE METHOD AND APPARATUS

(76) Inventor: Nabil N. Ghaly, South Huntington, NY (US)

( * ) Notice: Subject to any disclaimer, the term of this patent is extended or adjusted under 35 U.S.C. 154(b) by 1443 days.

(21) Appl. No.: 11/639,024

(22) Filed: Dec. 15, 2006

(65) Prior Publication Data

US 2007/0155463 A1 Jul. 5, 2007

Related U.S. Application Data

(60) Provisional application No. 60/751,760, filed on Dec. 20, 2005.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2011.01) |

(52) U.S. Cl.

USPC .................. 463/17; 463/16; 463/22; 463/23; 463/30; 463/31

(58) Field of Classification Search

USPC .............................. 463/17, 22, 23, 30, 31, 16

See application file for complete search history.

(56) References Cited

U.S. PATENT DOCUMENTS

| | | | | |
|---|---|---|---|---|
| 6,234,901 | B1 * | 5/2001 | Nagoshi et al. | 463/33 |
| 6,386,974 | B1 * | 5/2002 | Adams | 463/16 |
| 6,561,900 | B1 * | 5/2003 | Baerlocher et al. | 463/20 |
| 6,808,454 | B2 * | 10/2004 | Gerrard et al. | 463/20 |
| 2007/0060259 | A1 * | 3/2007 | Pececnik | 463/16 |

FOREIGN PATENT DOCUMENTS

| | | |
|---|---|---|
| GB | 2144644 A * | 3/1985 |

* cited by examiner

*Primary Examiner* — Omkar Deodhar
*Assistant Examiner* — Adetokunbo O Torimiro

(57) ABSTRACT

A gaming device method and apparatus is disclosed, and is based on simulated movement of a train, or a vehicle, on a route from an origination point to a destination point. In a preferred embodiment, a random number generator is used to assign speed limits that bound the safe movement of a train in a scenario, and/or to select the actual speed of the train in the scenario. A winning scenario is defined by the train reaching its destination, and occurs when the train maintains its actual speed within the safe speed limits. This gaming concept could be implemented as a primary gaming device, or as a bonus game in a traditional gaming machine. In an alternate embodiment, a spinning wheel, controlled by a random number generator, is used to select a destination for a train approaching a track juncture. At least one destination is predefined as a winning destination.

20 Claims, 6 Drawing Sheets

GAMING DEVICE METHOD AND APPARATUS

PARENT CASE TEXT

This utility application benefits from provisional application of U.S. Ser. No. 60/751,760, filed on Dec. 20, 2005.

BACKGROUND OF THE INVENTION

This invention relates generally to coin operated gaming machines, also known as slot machines, and in particular to a coin operated gaming machine wherein a coin or a value input device, a start lever, a primary gaming unit, a secondary gaming unit to provide a bonus game, and a coin hopper are provided. The primary gaming unit could be a conventional machine having a plurality of rotating mechanical reels, a video machine, a card gaming machine, or of the type disclosed in U.S. provisional patent application Ser. No. 60/494,355 as filed in the Patent Office on Aug. 12, 2003, inventor Nabil N. Ghaly, 36 pages of text, 28 drawing sheet; i.e., based on random assignment and manipulation of binary numbers, and the generation of corresponding displays at a plurality of playing positions.

There are many conventional slot machines that enable a player to activate a lever, which in turn causes a plurality of reels to spin and ultimately stop to display a random combination of some form of indicia. If this display contains one of a pre-selected plurality of winning combinations, the machine releases money into a payout chute or onto a credit meter for the player. A number of these machines offer the player a second opportunity to win in the form of a bonus game. Such a bonus game is operable when one or more reels of the primary gaming unit stop on certain predetermined indicia. The bonus game can then be activated by the player, and may result in additional winning payouts.

Since it is desirable to offer players games that they have not played before, it is one object of the current invention to offer players a new gaming device that provides excitement and additional opportunities to receive winning payouts.

It is also an object of this invention to provide an interactive bonus game based on a train traveling to a plurality of destinations.

It is another object of this invention to provide a slot machine, wherein a player activates a rotating or spinning wheel, which randomly activates track switches in order to send the train to different destinations, each of which has either a different payout amount, or no payout.

It is also an object of this invention to provide a video slot machine having a plurality of simulated rotating reels, which indicate a plurality of train and railroad symbols, and wherein the occurrence of predefined display pattern of predefined indicia will trigger a bonus game that depicts a train adventure.

It is still a further object of this invention to provide a slot machine, with a bonus game that simulates the movement of a train to intermediate stations, alternate final destinations, or to a railroad storage yard where no wining payout is provided.

It is also an object of this invention to provide a slot machine that includes random elements affecting the movements of a train to intermediate stations, alternate final destinations or to a railroad storage yard.

It is another object of this invention to provide a bonus game based on a runaway train adventure.

It is still an object of this invention to provide a bonus game wherein a runaway train may travel in one or a plurality of segments, each of which has one or a plurality of routes.

It is still a further object of the present invention to provide a bonus game wherein a runaway money train may travel in one or a plurality of segments, and wherein a player wins a prize upon successful completion of each segment.

It is also an object of this invention to provide a bonus game wherein the ultimate objective of the game is for the player to bring the train to a safe stop at the last segment in order to win the highest prize (jackpot).

SUMMARY OF THE INVENTION

The foregoing and other objects of the invention are accomplished by a coin operated gaming machine having a first gaming unit of the rotating reels type, providing a card game, or of the type disclosed in U.S. provisional patent application Ser. No. 60/494,355, as filed in the Patent Office on Aug. 12, 2003, inventor Nabil N. Ghaly, 36 pages of text, 28 drawing sheet; i.e., based on random assignment and manipulation of binary numbers, and the generation of corresponding displays at a plurality of playing positions. According to a preferred embodiment, a bonus game is operable when primary reels of a slot machine stop on certain predetermined indicia. It would be preferable for the various symbols on the reels to depict different types of trains, or railroad equipment. One bonus game is based on the steam railroad era, and consists of an animated video display depicting a runaway train moving in a plurality of consecutive segments. The game starts by showing the train approaching a track junction, with a plurality of routes leading to a first destination. The player is requested to select one of said plurality of routes, and to actuate a rotating wheel that randomly determines the speed of the runaway train in the first segment. Alternatively, a second rotating wheel could be used to randomly select a route. Said routes may include a mountain route, a river route, a coastal route, a city route, and a desert route. Each of these routes has speed restrictions (safe speed limits) that must be adhered to in order for the train to arrive safely at the destination.

For example, if the player selects the mountain route, the speed must be higher than a first value in order for the train to escape falling rocks, but should be lower than a second value to successfully negotiate a curve around the mountain. Similarly, if the player selects a river route, the speed should be lower than a set value in order to avoid collapsing a high wooden bridge over the river. An alternate river route, has an open bridge, and would require the train to travel below a certain speed to permit the bridge to move to a close position before the arrival of the train. For each selected route, there is a distinct probability, based on the random speed, that the train will successfully reach the first destination. The player is awarded a first bonus payout if the train reaches the first destination. The player is also afforded an opportunity to continue the game by proceeding to a second destination. The player is advised that if he or she fails to reach the second destination, they will forfeit a portion of said first bonus.

If the player elects to continue the game, he or she will be required to select a route to the second destination, and to actuate the speed wheel in order to determine the speed of the train in the second segment. Similar to the first segment, the routes in the second segment have speed restrictions (safe speed limits) associated with them, however, such restrictions are tighter than those associated with the first segment. This will have the effect of reducing the probability of winning a second bonus payout, which is set higher than the first bonus payout.

If the player successfully completes the second segment, he is credited the second bonus payout, and given an opportunity to proceed to the third segment. Conversely, if the player is not successful in completing the second segment, the bonus game terminates, and control is returned to the primary gaming unit. A total of five segments are provided in the bonus game, with the highest payout award (jackpot) reserved for the destination at the fifth and last segment.

To enhance game play, an optional speedometer that indicates the current speed of the train may be added to the bonus game machine. Also, scenes depicting up or down hills may be inserted at random to a particular route to decrease or increase the speed of a train traveling through that route. Further, additional elements, or adventures, could be randomly introduced into any segment. For example, weather elements such as heavy rain, sleet or snow can wash up or obstruct the tracks. Also, bandits could be blowing up a bridge, blocking the tracks, etc. Conversely heavy rain could extinguish explosive set up by bandits to derail the train. All conditions for a particular segment are established or selected using random elements.

According to an alternate embodiment of the present invention, or as a second bonus game, the bonus game consists of a train traveling in a plurality of segments, each of which has a plurality of destinations. At each track junction, the player is requested to actuate a rotating wheel to select the destination for the next segment. A payout bonus is awarded to the player upon reaching a destination. The amount of such bonus is dependent on a number of factors, including the amount of the wager, the track segment, and the destination. The bonus game ends when the rotating wheel selects a destination leading to a railroad storage yard. Each segment has different destinations, and the bonus award associated with each destination could also be selected at random from a plurality of awards, and is disclosed to the player after reaching the destination.

According to one preferred embodiment of the present invention, the rotating speed wheel is electro-mechanically operated and is linked to a random number generator, which determines where the speed indicator actually stops.

According to another preferred embodiment of the present invention, the rotating speed wheel is provided by electronic means for displaying indicia of rotating reel or wheel such as a video or an LCD screen.

The present invention also comprises methods for playing a bonus game of chance. One preferred method comprises a train traveling to a destination, the steps of selecting one of a plurality of routes to said destination, randomly establishing speed for the traveling train, and determining if such speed is compatible with predetermined or randomly determined "safe" speeds associated with the selected route.

It should be noted that the above disclosed parameters for a runaway train adventure is set forth herein for the purpose of describing the preferred embodiment, and is not intended to limit the invention herein. Parameters other than speed could be used in a train adventure scenario. For example, an incapacitated train operator, or a train taken over by bandits could be the cause of a runaway train. In such a case, the player is challenged to bring the train to a safe stop by using a number of parameters that are controlled by a random number generator. These parameters could include routing the train at a track juncture to a destination where a sheriff is awaiting, selecting a qualified passenger to take back control of the train, or shooting an arrow or a gun at the train to disable the steam engine. A second example could be based on a confused freight train operator attempting to deliver diversified cargo items to a plurality of destinations. A winning scenario occurs when the proper cargo is delivered to the correct station, or destination.

BRIEF DESCRIPTION OF THE DRAWINGS

These and other more detailed and specific objectives will be disclosed in the course of the following description taken in conjunction with the accompanying drawings wherein.

Figure 1:
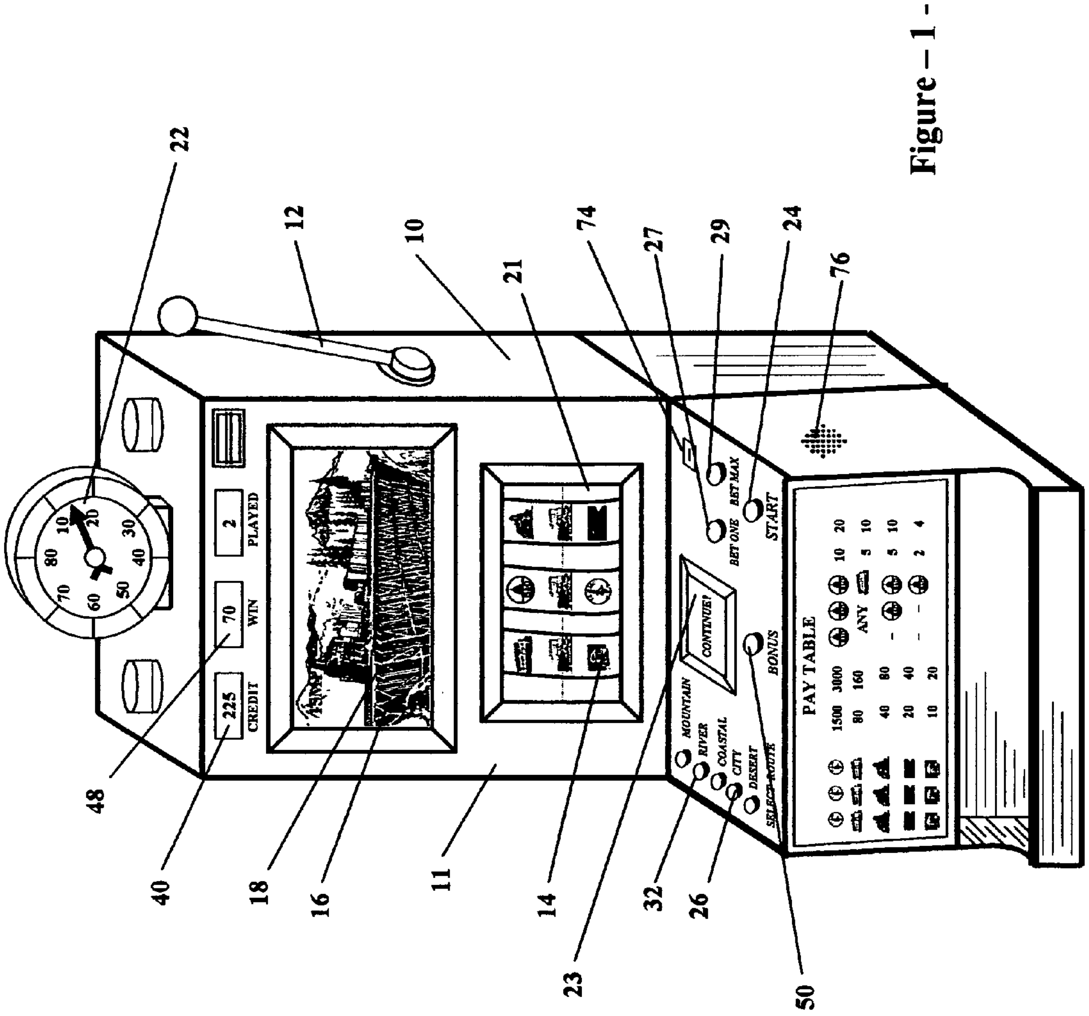
FIG. 1 is a perspective view of the preferred embodiment of a coin operated gaming machine according to the invention.

While the invention is susceptible to various modifications and alternative forms, specific embodiments have been shown by way of example in the drawings and will be described in detail herein. It should be understood, however, that the invention is not intended to be limited to the particular forms disclosed. As would be appreciated by persons of ordinary skills in the art, alternative train adventures with a plurality of scenarios could be derived, and wherein one of said scenarios is defined as a winning scenario. Accordingly, the invention is to cover all modifications, equivalents, and alternatives falling within the spirit and scope of the invention as defined by the appended claims.

Description of the Preferred Embodiment

The preferred embodiment of the present invention is designed to provide added excitement to a primary gaming device in order to increase the enjoyment to players and to serve as an added attraction to potential players. Referring now to the drawings where the illustrations are for the purpose of describing the preferred embodiment of the invention and are not intended to limit the invention hereto, FIG. 1 is a front plan view of a gaming machine 10 is comprised of a housing 11 having three to five rotating reels 14, each of which comprises a plurality of reel symbols on the periphery thereof depicting different type trains and other railroad equipment, and a CRT, an LCD 16, or other type screen such as digital light processor, or plasma screens to display video and/or animated carton images associated with the bonus game. The gaming machine, also, includes a rotating or spinning mechanical wheel 22, which is activated by the player using the start button 24. The rotating wheel comprises a plurality of indicia representing various speeds for a runaway train. Further, the gaming machine includes a plurality of push buttons 26, each of which is associated with a specific route within a segment. In addition, the gaming machine comprises a mechanical lever 12, coin slot 74, and a currency validator (not shown).

In a manner that will be recognized by those skilled in the art, each reel 14 is designed to rotate, and then stop in order to visually display at least one, and preferably a number of indicia. The display for the primary machine includes one, or preferably a plurality of winning lines, also known in the art as pay lines. If the combination of indicia displayed by the rotating reels, at a winning line, is one of a predetermined plurality of winning indicia sets, then the player can typically be provided with a winning payout either through coin chute that deposits winnings into a coin trough, or by increasing the player's credits in a coin credit meter 40. According to the present invention, when the reels 14 display a particular indicia combination, at a winning line, then the player is provided with an opportunity for a bonus game.

According to the present invention, a bonus actuator button 50 is placed in an operative state when reels 14 display a bonus indicia combination. A player must then depress said bonus actuator 50 in order to start the bonus game. Upon the activation of the bonus actuator 50, a video cartoon introduction to the game is played on the screen 16. The setting for the game is based on the steam locomotive era of railroading (early $20^{th}$ century). The introduction provides a background for the incident that led to a runaway train, and shows a steam locomotive traveling at high speed, with a train operator (driver) desperately trying to stop the train by pulling various levers. The next scene shows a dispatcher at a railroad junction receiving a telegram informing him that a runaway train is coming his way, and requesting that he routes the train out of harm's way. It should be noted that rather than using cartoon production to implement various scenes, a game designer may elect to employ actors to produce the required scenes.

The player is then requested to select a route leading to a first destination for the runaway train. According to the preferred embodiment of the present invention, the player is provided with five alternate routes to select from, which all lead to said first destination. These routes are described as a mountain, river, coastal, city, and desert route. Associated with each route is a button actuator 26 that is placed in an operative state during this scene. Upon the activation of a route button, an indicator 32 associated with said button is energized to indicate to the player the selected route. Each of these routes has associated speed characteristics, or restrictions, that must be adhered to in order for the train to arrive safely to the destination. Further, there is a plurality of alternate scenes, for each route type, which are stored in memory. Each of said scenes is described and identified by two parameters. The first parameter represents speed restrictions associated with the route (safe speed limits), and is selected at random by the control program. Such random selection is transparent to the player. The second parameter is selected at random by the player, using a rotatable or spinning wheel 22, and is related to the actual speed of the train within the selected route.

Upon the selection of these two parameters, a unique scene is identified, and is played on the screen 16. The selected scene consists of a video cartoon showing the runaway train traveling through the selected route, at a speed determined by the rotatable wheel 22, and subject to the speed constraints for the route. The relationship between said speed constraints, and actual speed, determines what occurs to the train within the selected route. There are two possible scenarios. In the first set-up, the train speed falls within the speed constraints of the selected route, and arrives safely at the destination. Alternatively, the actual speed of the train is outside the speed constraints, and the train falls into harms way, and do not arrive at the destination. Since the two parameters are known prior to the selection and presentation of the scene on the screen 16, and because the selected scene is based on these parameters, it would appear to the player that the events in the scene are a direct consequence of the random outcome of the rotatable wheel.

As an example to illustrate the preferred embodiment, if the player selects the mountain route, the speed constraints consist of two values. The first value represents the minimum speed that enables the train to escape falling rocks. The second value represents the maximum speed that would enable a train to successfully negotiate a curve around the mountain. In this case there are three possible scenes that depict the two scenarios. In the first scene, the speed of the train, as determined by the rotatable wheel 22, is below the minimum speed and, as such, the train is hit by falling rocks. In the second scene, the speed of the train falls between the minimum and maximum speeds and, as such, the train escapes the falling rocks, successfully negotiate the curve around the mountain, and arrive safely at the destination. In the third scene, the speed of the train is higher than the maximum speed and, as such, the train escapes the falling rocks, but derails around the mountain. If the speed of the train, as determined by the rotatable wheel 22, results in the selection of either the first or third scenes, then the player is informed that the bonus game is over, and the control is returned to the primary game. Alternatively, if the speed of the train, as determined by the rotatable wheel 22, leads to the selection of the second scene, and the successful arrival of the train to the destination, then the player is rewarded with a winning payout. The player is then advised that he or she may continue with the bonus game to a second destination with the understanding that they would forfeit a portion of their winning payout. The player is further informed of the winning payout associated with the second destination. The player is then requested to activate either the bonus actuator button 50, if he or she would like to continue with the bonus game or the start button 24 if he or she would like to terminate the bonus game. If the player elects to terminate the bonus game by activating the start button 24, then the player is provided with the winning payout either through the coin chute 20, or by increasing the player's credits in the coin credit meter 40. The preferred embodiment also includes an information screen 23 to communicate information related to the bonus game to the player.

Alternatively, if the player elects to continue with the bonus game, then he or she is requested to select a route leading to a second destination for the runaway train. Similar to the first destination, the player is provided with five alternate routes to select from, which all lead to said second destination. These routes could also be described as a mountain, river, coastal, city, and desert route, or could be depicted differently. The process used for the first destination is then repeated, including the selection and presentation of a scene on the screen 16, and the determination if the train is able to reach the second destination.

The above-disclosed methodology is repeated for a total of five consecutive destinations leading to a final destination with a jackpot winning payout. For each stage of this multi-stage bonus game, there is a distinct probability, based on the random speed constraints, and the random train speed, that the train will successfully reach the destination. The bonus game is designed such that the probability of winning the first stage is very high, and with decreasing winning chances for successive stages. Because the probability of successfully completing the jackpot stage is dependent on the successful completion of the first four stages, it follows that the probability of winning the jackpot is fairly small. Further, special features that affect the speed of the train in a particular route could be inserted as additional settings at random prior to the selection of a scene. For example, an up hill on the route could be used to reduce the speed of the train prior to reaching a speed limit zone. Conversely, a downhill could be used to increase the speed of the train before reaching such speed zone.

It should be noted that the above described example, and methodology are being disclosed herein for the purpose of describing the preferred embodiment, and are not intended to limit the invention hereto. As would be appreciated by a person of ordinary skills in the art, certain modifications, deletions, or additions to said example or methodology are possible. For example, the specific routes or scenes could be described differently. Also, a methodology that is not based on the speed of the train could be derived. For example, the bonus game could be based on a money train that is prevented from reaching its destination, irrespective of its speed, because of train robbers, accidents, weather elements, or the like. Such factors could be incorporated into the bonus game using random elements. Further, it is not necessary to have a multi-stage bonus game. A single stage game could be implemented as described herein. In addition, the game could simply be based on a train traveling in a network of interconnected routes, and wherein a rotatable wheel is used by the player to randomly select a route for the train at each juncture. After the random selection of a route, the train reaches an intermediate destination, where the player is rewarded with a winning payout. The game ends when the train reaches an ultimate destination (jackpot), one of a plurality of terminal stations (various winning payouts), or a storage yard (reduction in winning payout). Also, the concept described in this invention could be implemented using any vehicle such as an automobile, a bus, a boat, a plane, a military vehicle, or the like.

It should also be noted that it is not necessary to use manual selection of a route to implement the preferred embodiment. As would be appreciated by a person skilled in the art, the selection of a route could be determined by a program segment of the control program without an input from the player. For example, such program segment could employ a random number generator to select one of a plurality of routes. Alternatively, a predefined sequence of routes could be selected based on the progress of the bonus game.

Furthermore, an alternate method to implement the bonus game could be based on a singular random number that is generated at the time the bonus game is started. This random number determines the number of successful stages awarded to the player in the bonus game. In this case, the progress of the bonus game is as described above. However, the route selections by the player do not affect the outcome of the bonus game, which is determined solely by the random number generated at the beginning of the game.

Figure 6:
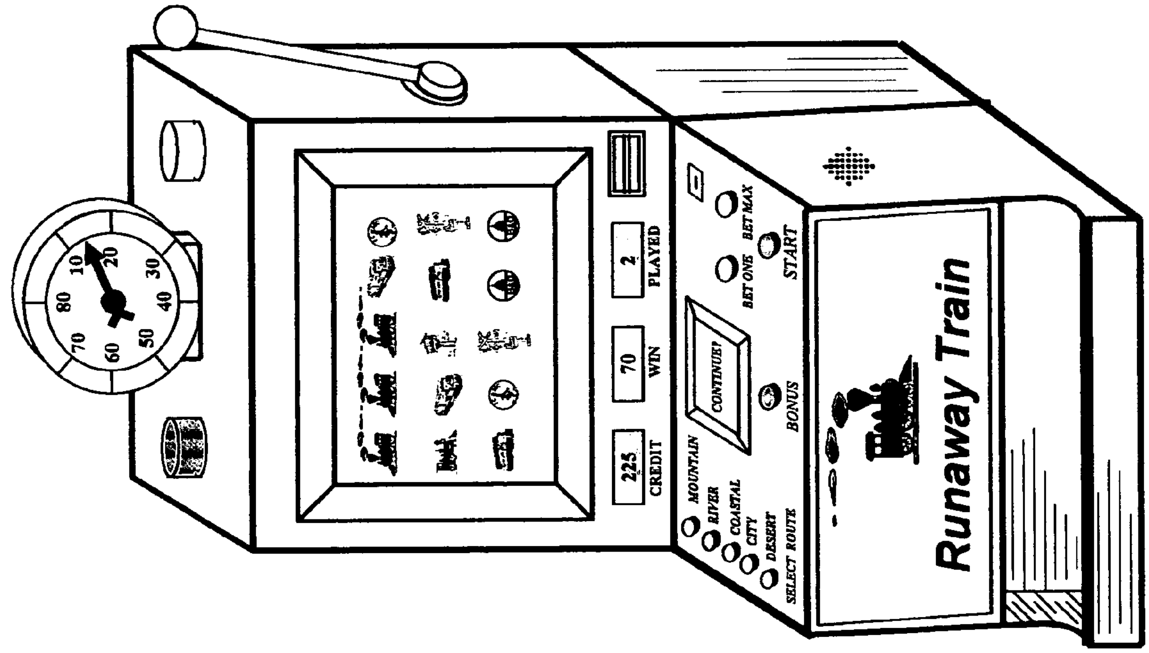
FIG. 6 indicates a perspective view of an alternate embodiment that is based on a video slot machine according to the invention.

Also, while it is preferable to implement the invention described herein as a bonus game for a primary slot machine, there is no technical or other reason why this invention cannot be implemented as a stand alone gaming device. Under one alternate embodiment, it is not necessary to have rotating wheels that activate the bonus game. Rather, the game is activated upon setting forth a wager by the player. Further, under a second alternate embodiment, and as would be appreciated by a person skilled in the art, both the primary and bonus games could be implemented on a single video screen with five simulated rotating reels as indicated in FIG. 6. Each of these simulated rotating reels will indicate three (3) symbols at any given point in time for a total of fifteen (15) symbols. The display also includes a plurality of winning lines (typically 1 to 9 lines) that are selectable by the player prior to the initiation of game play. Similar to other video machines, this gaming device provides a "scatter" symbol represented by a railroad crossing gate with flashing lights, a "wild" symbol represented by a historic railroad logo, and two symbols for bonus games. For the "Runaway Train Adventure" bonus game, the device employs a symbol represented by an early steam engine. Also, for the destination bonus game, the device employs a symbol represented by a track switchman. The machine operates as a primary rotating reel machine until a combination of special indicia appears on any of the winning lines selected by the player triggers a bonus game.

In the preferred embodiment, the rotatable wheel 22 may be a carnival-type wheel comprising pegs and a clapper or could take one or more other forms, such as a fanciful wheel typically used in a roulette game. Further, the wheel could be implemented using a mechanical design, or could be constructed using a video display. The facing surface of the rotatable wheel 22 of FIG. 1 comprises a plurality of distinct areas bearing indicia of the speed of the train. Alternatively, the indicia could indicate various destinations that may include a train storage yard.

Figure 2:
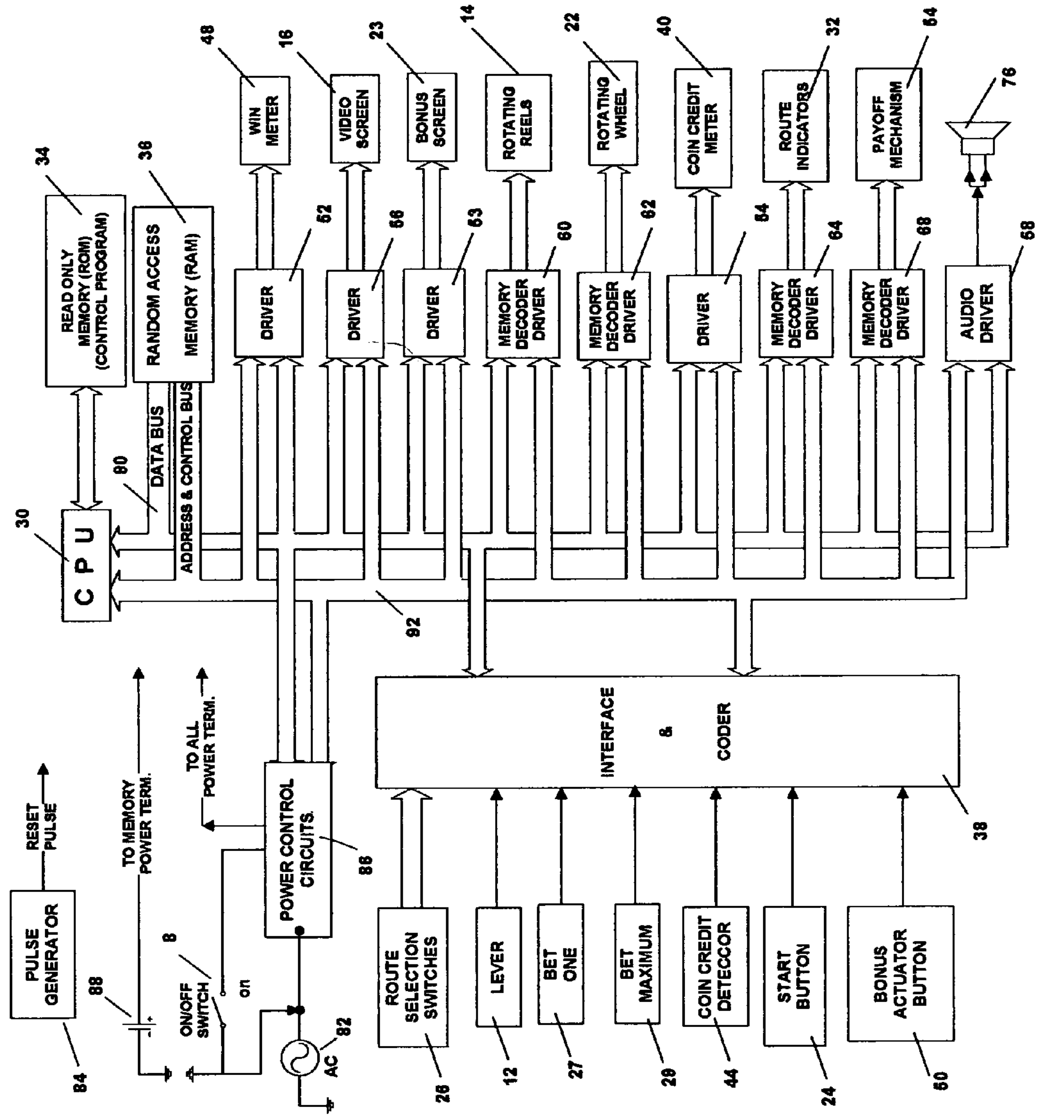
FIG. 2 indicates a block diagram of the microprocessor circuitry used to control the gaming machine according to the invention, for both the primary and bonus machine.

A block diagram of the control circuitry to operate this gaming device 10 is illustrated in FIG. 2. This block diagram includes a micro-controller with a central processing unit (CPU) 30 and system memory. The system memory preferably comprises a separate read-only memory (ROM) 34 and battery-backed random-access memory (RAM) 36. It will be appreciated, however, that the system memory may be implemented on any of several alternative types of memory structures or may be implemented on a single memory structure. For example, the read-only memory 34 may be replaced or supplemented with a mass storage unit such as a removable flash memory or a hard drive. The system memory is used to store game-related data associated with the chance games played on the slot machine. The game-related data may, for example, include game code, math tables, a random number generator, audio resources, and video resources. The player may select an amount to wager and other game play functions via touch screen keys (if provided) or a button panel that includes "BET ONE" 27, and "BET MAX" 29 buttons. The wager amount is signaled to the CPU 30 by a coin/credit detector 44. In response to the wager, the CPU 30, under the direction of the control program, executes the game code that, based on a randomly selected outcome, rotates and stops the mechanical reels 14*a*, 14*b*, 14*c* at the selected outcome. Also, the CPU 30 selectively accesses the video resources to be included in a video image 18 provided by the video display 16, and the audio resources to be played through one or more audio speakers 76 mounted to a housing of the slot machine. If the outcome corresponds to a winning outcome identified on the pay table, the CPU 30 instructs a payoff mechanism 54 to award a payoff for that winning outcome to the player in the form of coins or credits.

Referring again to FIG. 2, in order to operate the gaming device, the off-on switch 8 should be activated from the "off" position to the "on" position, which causes power to be supplied from the main external power supply 82 to the power control circuits 86, which in turn energizes all terminals of the gaming device 10. The gaming device also includes a rechargeable battery 88, which feeds the memory power terminals in order to ensure that critical data is not lost in the event of a loss of the external electrical supply 82. Further, the micro-controller includes input ports or interface and coder device 38 to interconnect the input control mechanisms 12, 24, 26, 27, 29, 44 & 50 with the CPU via the data bus 90, and the address and control bus 92. Similarly, indicators 32 and other output peripherals are connected to output ports or screen drivers 52, 53, 54 & 56, memory decoder drivers 60, 62, 64 & 68, and audio driver 58, and are interconnected with the CPU 30 via the data bus 90, and the address and control bus 92.

Figure 3:
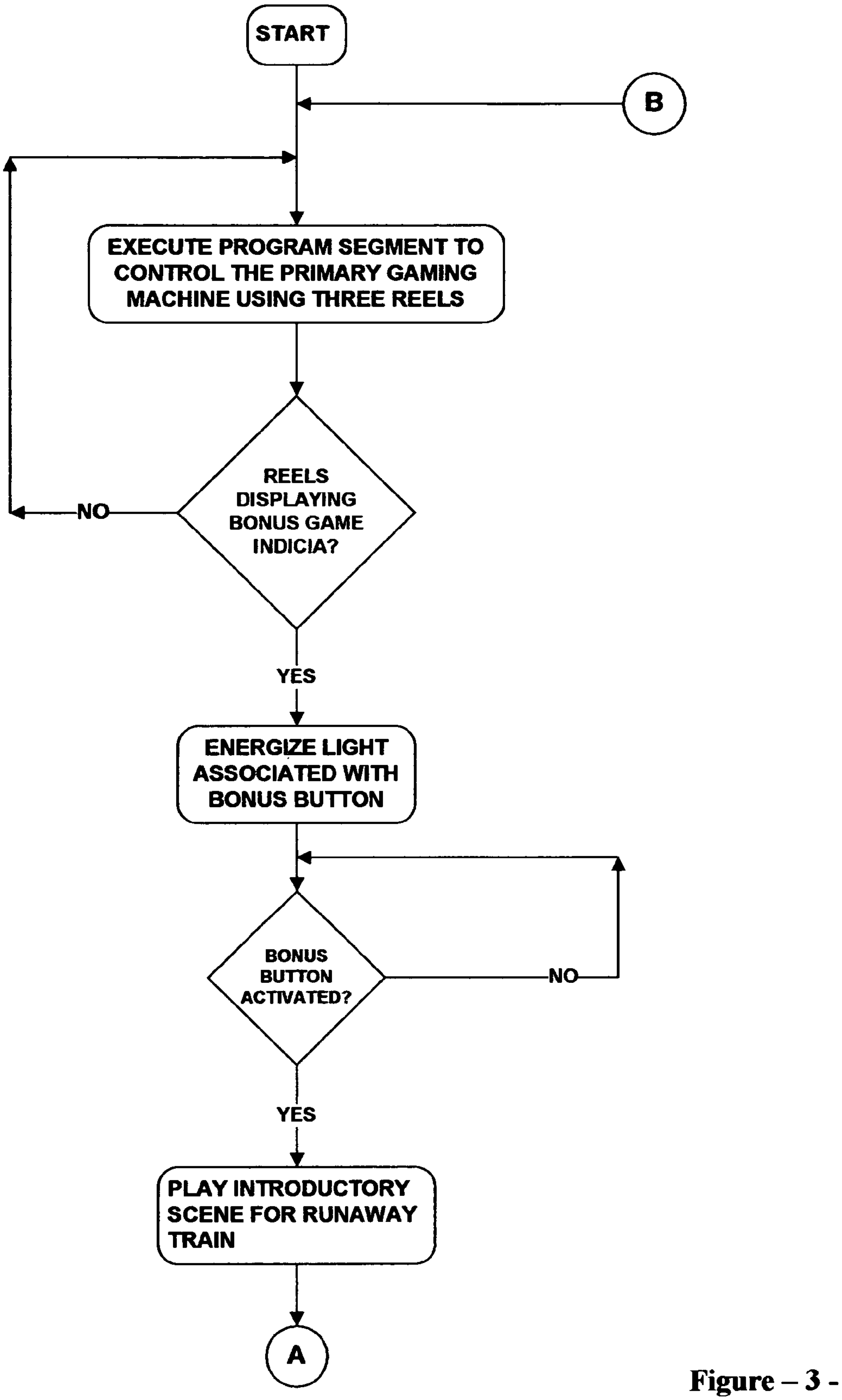
FIGS. 3-5 indicate a logical flow diagram illustrating the main program functions performed by the microprocessor controlling the bonus gaming machine according to the preferred embodiment of the invention.

Turning "on" the power causes a pulse generator 84 to generate a reset pulse. This pulse is applied to the central processing unit 30 and causes the central processing unit 30 to clear any data remaining in the RAM 36 and in the audio and screen drivers 52, 53, 54, 56 & 58 over the common data bus 90. The pulse will also cause the CPU 30 to initiate the execution of the software program stored in ROM 36, and which controls the gaming device. With respect to the operation of this gaming machine, the logic steps utilized are illustrated in flow diagram form in FIGS. 3-5, which interconnect with each other at the places shown in the various figures. Even though specific reference will not be made to this diagram in the following description of the operation of the slot machine, periodic reference to this diagram may prove to be helpful to the reader hereof The preferred embodiment consists of two main parts. A primary gaming unit that employs rotating reels, and a bonus gaming unit that is based on a train setting (runaway train adventure, multi-destination track configuration, or the like). Preferably, both units are controlled by different program segments of the same control program, which resides in ROM 34. The flow diagram of FIG. 3 shows the control program segment of the primary gaming unit as a single block. Said primary gaming unit, in the form of a standard three-reel slot machine, includes the conventional slot machine elements such as display reels 14, and suitable controls and currency mechanisms. These controls and mechanisms include a coin slot 74, bill validator (not shown), payout coin shoot, CHANGE button (not shown), BET ONE button 27, SPIN or START button 24, and BET MAX button 29. In order to activate the primary gaming unit, a player makes a wager by either pressing the BET ONE button 27, or the BET MAX button 29. After the player has selected the amount of his wager, he depresses the START button 24, or operates the main lever 12, which causes the reels shown in display window 21 to spin. These reels include a plurality of indicia located on the perimeter of each reel 14. A random number generator is used to control the stopping of each reel such that it will visually display at least one, and preferably a number of indicia, through the display window 21. When reels 14 display a particular indicia combination, or one of a predetermined plurality of indicia combinations, then the bonus game unit is activated, and a bonus start button 50 is placed in an operable state that is indicated to the player by energizing an associated light. In the preferred embodiment, the indicia of the reels represent a plurality of train symbols, and railroad equipment.

Upon a player depressing the bonus start button 50, the control program causes the video screen 16 to play an introductory scene related to the runaway train, which end with a request to the player to select a route by the activation of one of a plurality of route buttons 26. Simultaneously with said request, the control program places these route buttons into an operable state, and energizes associated light indicators 32. Upon the selection of a route by the player, and using a random number generator, the control program establishes speed limits for the selected routes, as well as any random features that affect the speed of a train traveling on that route. The player is then requested to activate the speed wheel by pressing the bonus start button 50.

Upon the activation of the speed wheel, and using a random number generator to stop said wheel, the control program establishes an operating speed for the runaway train in the selected route. Using the speed restrictions, and operating speed as attributes, the control program selects a scene consistent with such attributes. The selected scene depicts one of two scenarios. If the operating speed falls within the speed limits, the selected scene depicts a train that reaches its destination. Conversely, if the operating speed falls outside the speed limits, the selected scene depicts a train that falls into harm way, i.e., does not reach its destination.

If the train reaches its destination, the player is rewarded with a winning payout that is indicated on the win meter 48. The amount of such payout is dependent on a number of factors, including the amount of the player's wager, the scene selected, the speed of the train, etc. The control program will then credit the amount of the winning payout to the win meter, and will query the player on the bonus screen 23 if he or she would like to continue with the bonus game. If the player elects to continue, the control program updates the win meter 48, by deducting a predetermined wager, and returns the program counter to the beginning of the program segment that requests the player to select a route. Conversely, if the train does not reach its destination, the control program will display a "GAME OVER" message on the video screen 16, and will reactivate the primary gaming unit. If the player is able to continue with the bonus game until he or she successfully completes the fifth stage, then he or she wins the bonus game jackpot.

It should be noted that the use of a random number generator to generate both the safe speed limits, and the actual speed for the train, in a specific route, is being set forth for the purpose of describing the preferred embodiment, and is not intended to limit the invention herein. As would be understood by a person skilled in the art, a random number generator could be used to select the safe speed limits for a scenario, the actual train speed associated with the scenario, or to select both of these speed parameters.

Figure 4:
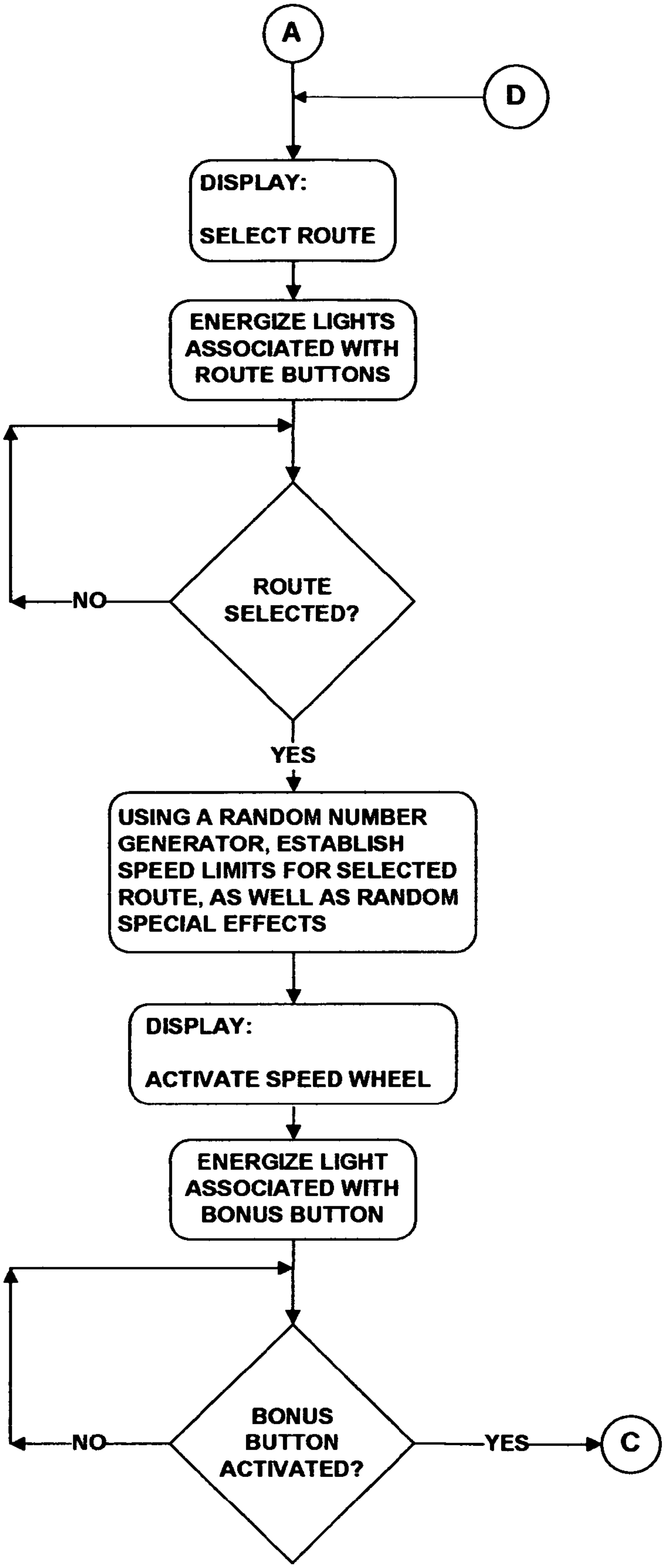
Figure 5:
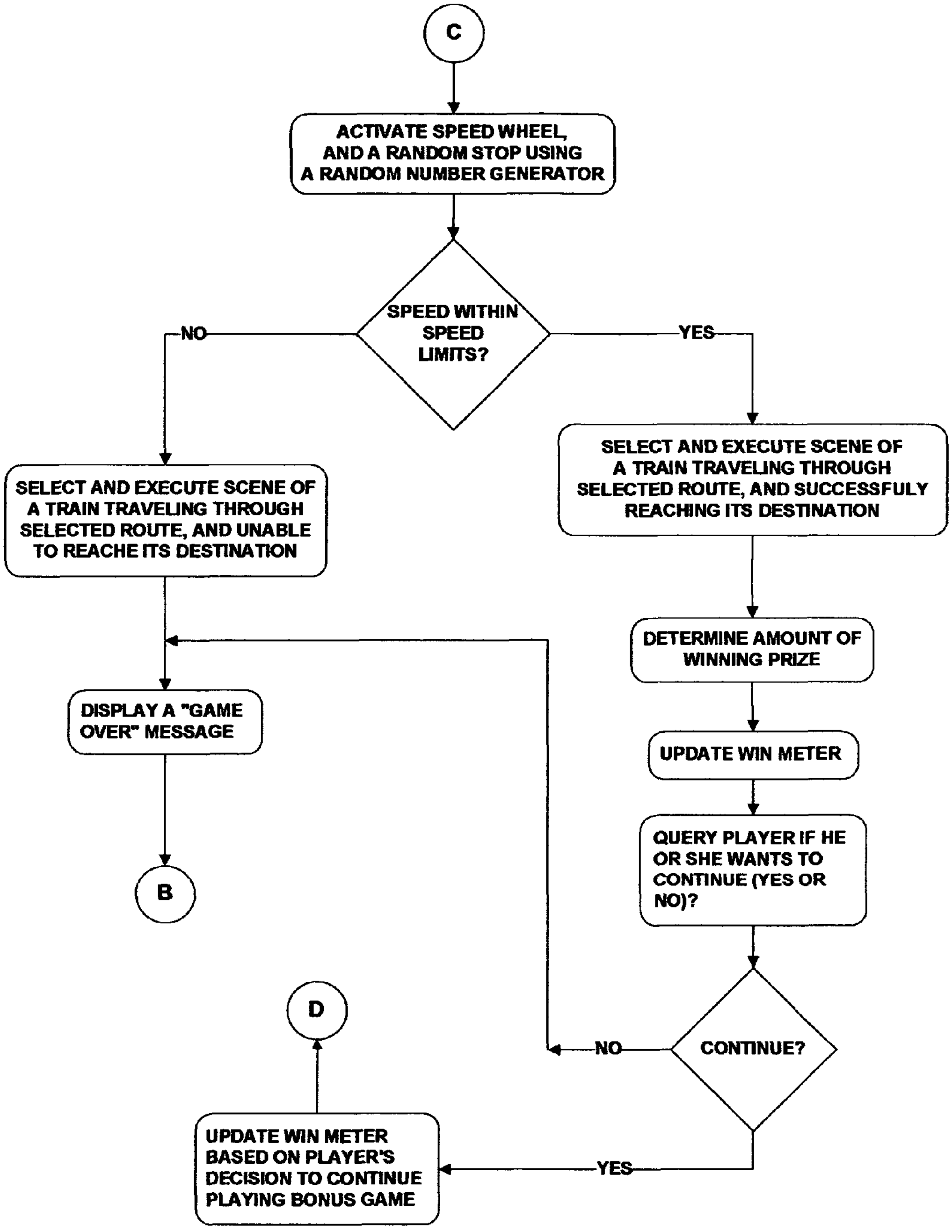

As will be understood by those skilled in the art, many different programs may be utilized to implement the flow charts disclosed in FIG. 3 through FIG. 5. Obviously these programs will vary from one another in some degree. However, it is well within the skill of the computer programmer to provide particular programs for implementing each of the steps of the flow charts disclosed herein. It is also to be understood that the foregoing detailed description has been given for clearness of understanding only and is intended to be exemplary of the invention while not limiting the invention to the exact embodiment shown. Obviously certain modifications, variations and improvements will occur to those skilled in the art upon reading the foregoing. It is, therefore, to be understood that all such modifications, variations and improvements have been deleted herein for the sake of conciseness and readability, but are properly within the scope and spirit of the following claims.

What is claimed and desired to be secured by Letters of Patent is:

1. A gaming device comprising:

means for providing a plurality of visual scenarios related to the movement of a vehicle in its operating environment on a route to a destination, wherein a scenario includes at least one vehicle operating parameter controlled by a random number generator, and which affects at least one of the movement of the vehicle in its operating environment and the outcome of the scenario, and wherein at least one of these scenarios is defined as a winning scenario, control means to enable a player to select one of said plurality of scenarios, and means for determining if a win has occurred.

2. A gaming device as recited in claim 1, wherein the device is implemented as a bonus game in a primary gaming machine.

3. A gaming device as recited in claim 2, further comprising means for activating the bonus game.

4. A gaming device as recited in claim 2, wherein said plurality of scenarios is based on a train approaching a track juncture leading to a plurality of destinations, and wherein the player selects a route for the train using a spinning wheel controlled by a random number generator, and wherein at least one of said destinations is a winning destination.

5. A gaming device as recited in claim 1 wherein a wining scenario is defined by a setting when the vehicle reaches a destination.

6. A gaming device as recited in claim 1, wherein said means to select a scenario includes random means that assigns values to said random parameter affecting the movement of the vehicle.

7. A gaming device as recited in claim 6, wherein said parameter controlled by a random number generator includes at least one of safe speed limits for the route traversed by the vehicle, and the actual speed for the vehicle.

8. A gaming device as recited in claim 7, wherein the actual speed of the vehicle is determined by the outcome of a spinning wheel controlled by a random number generator.

9. A gaming device comprising:

a microprocessor, a control program executed on the processor to control the operation of the device, a control program segment that provides a plurality of visual scenarios related to the movement of a vehicle in its operating environment on a route to a destination, wherein a scenario includes at least one vehicle operating parameter controlled by a random number generator, wherein said operating parameter affects at least one of the movement of the vehicle in its operating environment and the outcome of the scenario, and wherein at least one of these scenarios is defined as a winning scenario, at least one of input control mechanism, and a program segment to select one of said plurality of scenarios, and a control program segment that determines if a win has occurred.

10. A gaming device as recited in claim 9, wherein the device is implemented as a bonus game in a primary gaming machine.

11. A gaming device as recited in claim 9 wherein a wining scenario is defined by the setting when the vehicle reaches the destination.

12. A gaming device as recited in claim 11, wherein said parameter controlled by a random number generator includes at least one of speed restriction associated with the scenario, and the actual speed of the vehicle.

13. A gaming device as recited in claim 12, wherein the actual speed of the vehicle is determined by the outcome of a spinning wheel controlled by said random number generator.

14. A gaming device as recited in claim 9, wherein said plurality of scenarios are based on a vehicle approaching a juncture leading to a plurality of destinations, and wherein the player selects a route for the vehicle using a spinning wheel controlled by a random number generator, and wherein at least one of said destinations is a winning destination.

15. A gaming device comprising:

a microprocessor, a control program executed on the processor to control the operation of the device, a control program segment that provides a plurality of visual scenarios related to the movement of a vehicle in its operating environment on a route to a destination, wherein a scenario includes a speed limit associated with the route, and an actual speed for the vehicle, wherein at least one of the speed limit and the actual speed is generated randomly, and wherein a wining scenario occurs when the actual vehicle speed is equal to or less than the speed limit, at least one of input control mechanism, and a program segment to select one of said plurality of scenarios, and a control program segment that determines if a win has occurred.

16. A gaming device comprising:

a microprocessor, a control program executed on the processor to control the operation of the device, a control program segment that provides a plurality of visual scenarios related to a train approaching a track juncture in its operating environment, wherein said track juncture leads to a plurality of destinations, and wherein at least one destination is defined as a winning destination, input control mechanism that activates a rotating wheel to select one of said plurality of destinations, wherein the rotating wheel is controlled by a random number generator, and a control program segment to determine if the selected destination is a winning destination.

17. A gaming device comprising:

a microprocessor, a control program executed on the processor to control the operation of the device, a control program segment that provides a plurality of visual scenarios related to a runaway train adventure, wherein the speed of the train is controlled by a random number generator, and wherein in at least one of these scenarios the train is brought to a stop, a control program segment that selects one of said plurality of scenarios, and a control program segment to pay the player a winning amount if the train is successfully brought to a stop.

18. A gaming device as recited in claim 17, wherein said program segment that selects one of said plurality of scenarios employs a random number generator.

19. A gaming device as recited in claim 17, wherein said program segment to select one of said plurality of scenarios is activated by an input control mechanism.

20. A method for a gaming device comprising the steps of:

providing a plurality of visual scenarios related to the movement of a vehicle in its operating environment, wherein a scenario includes at least one vehicle operating parameter controlled by a random number generator, and wherein said operating parameter affects at least one of vehicle movement in its operating environment and the outcome of the scenario, defining at least one of these scenarios as a winning scenario, providing means for selecting one of said plurality of scenarios, and determining if a win has occurred.

* * * * *